US008373088B2

(12) United States Patent
Kang

(10) Patent No.: US 8,373,088 B2
(45) Date of Patent: Feb. 12, 2013

(54) APPARATUS FOR UNIFORMLY GENERATING ATMOSPHERIC PRESSURE PLASMA

(76) Inventor: Bang Kwon Kang, Suwon (KR)

( * ) Notice: Subject to any disclaimer, the term of this patent is extended or adjusted under 35 U.S.C. 154(b) by 768 days.

(21) Appl. No.: 12/449,252

(22) PCT Filed: Feb. 1, 2008

(86) PCT No.: PCT/KR2008/000617
§ 371 (c)(1), (2), (4) Date: Jul. 30, 2009

(87) PCT Pub. No.: WO2008/094009
PCT Pub. Date: Aug. 7, 2008

(65) Prior Publication Data

US 2010/0044352 A1 Feb. 25, 2010

(30) Foreign Application Priority Data

Feb. 2, 2007 (KR) ........................ 10-2007-0011149
Jan. 31, 2008 (KR) ........................ 10-2008-0010285

(51) Int. Cl.
*B23K 10/00* (2006.01)

(52) U.S. Cl. ............ 219/121.5; 219/121.51; 219/121.48

(58) Field of Classification Search ............. 219/121.36, 219/121.43, 121.5, 121.51, 121.52, 75, 121.48
See application file for complete search history.

(56) References Cited

U.S. PATENT DOCUMENTS 6,521,859 B2 * 2/2003 Jensen ..................... 219/121.59
7,647,887 B2 * 1/2010 Maeda et al. ............. 118/723 E
7,820,935 B2 * 10/2010 Tverskoi et al. ......... 219/121.39
8,269,510 B2 * 9/2012 Kim et al. ..................... 324/671

* cited by examiner

*Primary Examiner* — Mark Paschall
(74) *Attorney, Agent, or Firm* — Stein McEwen, LLP

(57) ABSTRACT

An atmospheric pressure plasma generation apparatus is provided for generating plasma at the atmospheric pressure with stable voltage supply. A plasma generation apparatus of the preset invention includes a first conductor arranged to face a workpiece and having a power plate through power is applied; a second conductor arranged oppositely to a surface facing the workpiece along the first conductor for define a discharge space; and a gas supply unit having a gas supply passage for guiding gas to the discharge space and supporting the first and second conductors. The atmospheric plasma generation apparatus of the present invention is advantageous since the plasma can be uniformly generated in stable manner at an atmospheric pressure on the basis of a stable voltage supply.

25 Claims, 7 Drawing Sheets

Fig. 7
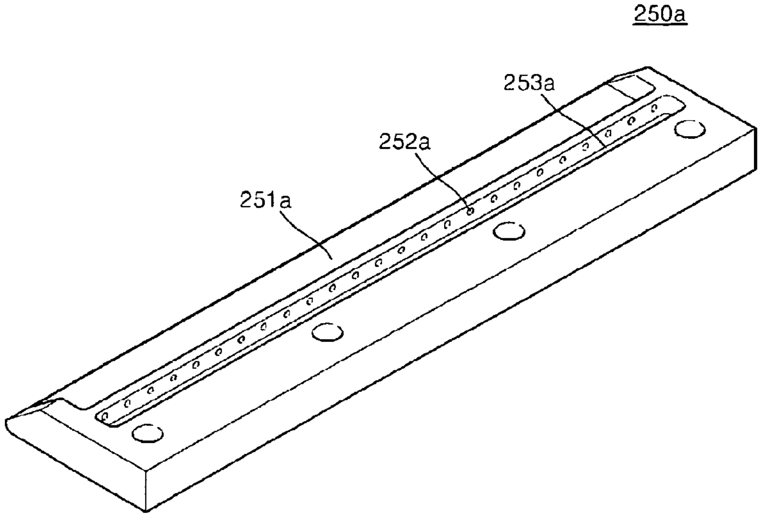
Fig. 8
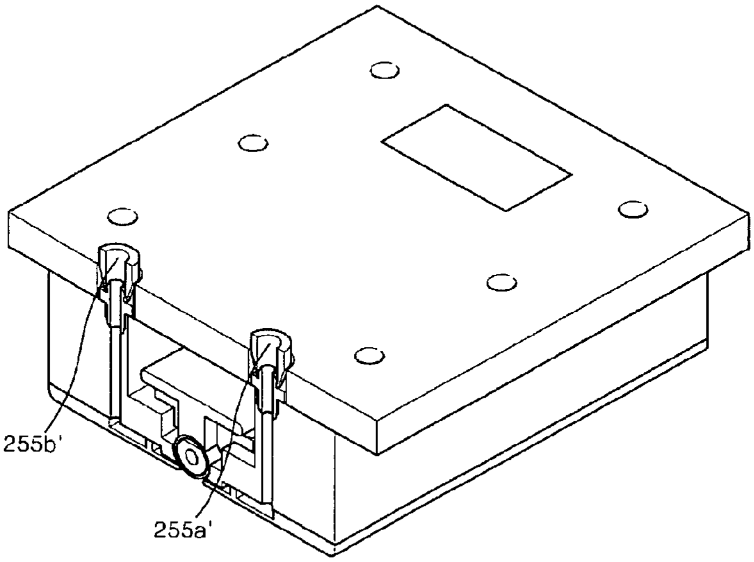
[Fig. 9]
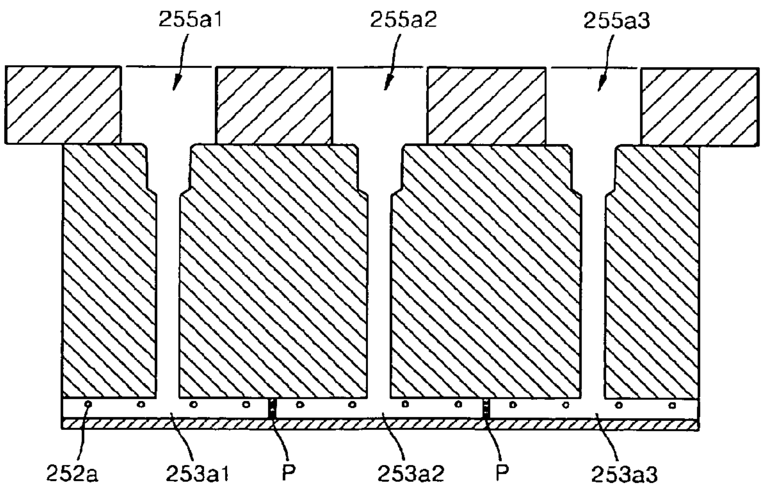

APPARATUS FOR UNIFORMLY GENERATING ATMOSPHERIC PRESSURE PLASMA

This is a National Phase Application filed under 35 USC 371 of International Application No. PCT/KR2008/000617, filed on Feb. 1, 2008, which claims foreign priority benefits under 35 USC 119 of Korean Application No. 10-2007-0011149, filed on Feb. 2, 2007, and which claims foreign priority benefits under 35 USC 119 of Korean Application No. 10-2008-0010285, filed on Jan. 31, 2008, the entire content of each of which is hereby incorporated herein by reference in its entirety.

TECHNICAL FIELD

The present invention relates to a plasma generation apparatus and, in particular, to an atmospheric pressure plasma generation method capable of uniformly and stably generating plasma at the atmospheric pressure with stable voltage supply.

BACKGROUND ART

With the advantageous fluxes of reactive species such as ions and radicals, plasma-based surface treatment methods have been extensively used. In the conventional plasma-based surface treatment methods, the plasma is generated in a high temperature and high pressure chamber. As such, it is limited to select the conventional plasma processing technique for treating the material having a low melting point such as plastic. Additionally, the conventional plasma processing requires high capital cost for maintaining a vacuum chamber and the space limit of the vacuum chamber is infeasible for treating large workpiece.

In order to solve these problems, an atmospheric plasma processing technique, which is feasible in an atmospheric pressure and temperature, has been proposed. Here, the atmospheric pressure means the pressure exerted by the atmosphere as a result of gravitational attraction. Using the atmospheric plasma (or low temperature plasma), it is possible to perform the surface treatment on the material having a low melting point such as plastic without damaging the surface of the material or changing physical properties of the material. The atmospheric plasma processing technique allows iterative surface treatments, thereby dramatically increasing the productivity. Also, processing materials at atmospheric pressure reduce the capital cost of the vacuum chamber and eliminates restriction to the size of the workpiece.

FIG. 1 is a cross sectional view illustrating a conventional atmospheric plasma generation apparatus disclosed in Korean Patent Laid-Open Publication No. 10-516329 filed by the same applicant.

In FIG. 1, the plasma generation apparatus 100 includes a power supply electrode 110, a main plasma ground electrode 120, an auxiliary plasma ground electrode 130, a gas flow passage 140, and a power source 150.

The power supply electrode has a long cylindrical shape. The main plasma ground electrode 120 is arranged below the power supply electrode 110, and the auxiliary plasma ground electrode 130 is arranged at one side of the power supply electrode 110. The power supply electrode 110 is coated by a dielectric layer 111. The gas flow passage 140 is formed between the power supply electrode 110 and the auxiliary plasma ground electrode 130 for supplying gas.

The power source 150 supplies radio frequency (RF) power to the power supply electrode 110. In order to match the RF power to the power supply electrode 110, the plasma generation apparatus 100 further includes a matching box (MB) 150.

The gas flow passage 140 is provided with a first passage 141, a second passage 143, a plurality of orifices 145, and a gas mixture chamber 147. The first passage 141 receives the gas input from outside of the plasma generation apparatus 100, and the second passage 143 is connected to the first passage 141 and formed in parallel with the power supply electrode 110. The orifices 145 are formed along the longitudinal direction of the power supply electrode 110 so as to be connected to the second passage 143. The gas mixture chamber 147 is formed along the longitudinal direction of the power supply electrode 110 and connected to the orifices 145 independently. The gas mixture chamber 147 is connected to a discharge space formed between the power supply electrode 110 and the auxiliary plasma ground electrode 130. A workpiece (M) is transferred to be positioned between the power supply electrode 110 and the main plasma ground electrode 140.

The plasma generation apparatus 100 of FIG. 1 can generates auxiliary plasma at a low voltage since the auxiliary plasma ground electrode 130 is positioned close the power supply electrode 110. As passing the auxiliary plasma, the energy level of the gas increases such that the gas passing the reactive space between the power supply electrode 110 and the main plasma ground electrode 120 can be changed to the plasma state with low voltage.

In the conventional plasma generation apparatus 100 of FIG. 1, however, the cylindrical power supply electrode is connected to the power source 150 at its one end such that the RF power is not uniformly applied to the power supply electrode 100 in its longitudinal direction, resulting in unstable generation of plasma.

Also, the convention plasma generation apparatus 100 is configured such that the outlets of the orifices 145 are directly oriented to the reaction space adjacent to the power supply electrode 110, whereby the gas passed the orifices 145 are not mixed enough. This causes irregular pressure distribution in the mixture space and fails supplying uniform pressure gas along the longitudinal direction of the power supply electrode 110, resulting in unstable plasma generation.

DISCLOSURE OF INVENTION

Technical Problem

The present invention has been made in an effort to solve the above problems, and it is an object of the present invention to provide an atmospheric plasma generation apparatus that is capable of stably generating uniform plasma at the atmospheric pressure.

Technical Solution

In one aspect of the present invention, the above and other objects of the present invention are accomplished by a plasma generation apparatus. The plasma generation apparatus includes a first conductor arranged to face a workpiece and having a power plate through power is applied; a second conductor arranged oppositely to a surface facing the workpiece along the first conductor for define a discharge space; and a gas supply unit having a gas supply passage for guiding gas to the discharge space and supporting the first and second conductors.

Preferably, the first conductor includes a power supply electrode connected to the power plate, and at least one plasma generation electrode connected to the power supply electrode, at least one part, along a longitudinal direction.

Preferably, the plasma generation apparatus further includes a dielectric member surrounding the plasma generation electrode except for one side connected to the power supply electrode.

Preferably, the power supply unit is provided with a dielectric part adjacent to the dielectric member.

Preferably, the power plate is formed having a width wider than that of the plasma generation electrode.

Preferably, the plasma generation apparatus further includes a fixing means for fixing the plasma generation electrode to the gas supply unit.

Preferably, the power plate includes a temperature adjustment means for adjusting temperature of the first conductor.

Preferably, the temperature adjustment means is a hollow passage formed inside of the power plate.

Preferably, the hollow passage penetrates the power plate in a zigzag pattern.

Preferably, the power plate is provided with a gas supply passage for guiding the gas between the plasma generation electrodes.

Preferably, the gas supply unit is made of a dielectric material.

Preferably, the gas supply passage includes a gas inlet passage for leading the gas from outside; a buffer space formed to communicate with the gas inlet passage in a longitudinal direction; a mixture space formed having a distance with the buffer space and communicate with the discharge space along the longitudinal direction; and a plurality of orifices formed so as to orient from the buffer space to the mixture space horizontally.

Preferably, the gas inlet passage is formed on a top surface of the gas supply unit in multiple numbers, and the buffer space is provided with sub-buffer spaces corresponding to the respective gas inlet passage, adjacent sub-buffer spaces being provided with a plurality of orifices isolated from each other.

Preferably, the power is provided at a frequency range between 400 Hhz and 600 MHz.

Preferably, the gas is a mixture gas including over 50% of inert gas, and the inert gas is any of argon, helium, or neon, or a mixture of at least two of the gases.

Preferably, the plasma generation apparatus further includes a third conductor on which the workpiece is placed, the third conductor being not connected to ground.

Preferably, the plasma generation apparatus further includes a dielectric plate on a top surface of the third conductor, the workpiece being placed on the dielectric plate.

Preferably, the plasma generation apparatus further includes a third conductor on which the workpiece is placed, the third conductor being applied by a pulse power or a direct current power.

In accordance with another aspect of the present invention, the above and other objects are accomplished by a power supply electrode of a plasma generation apparatus. The power supply electrode includes a power plate to which a power is applied; and at least one plasma generation electrode connected to the power supply electrode, at least one part, along a longitudinal direction.

Preferably, the power supply electrode further includes a dielectric member surrounding the plasma generation electrode except for one side connected to the power supply electrode.

Preferably, the dielectric member surrounds the plasma generation electrode expert for one side connected to the power plate, the dielectric member being made of at least one of quartz, glass, silicon, aluminum, and ceramic.

Preferably, the power plate is provided with a temperature adjustment means for adjusting temperature of the plasma generation electrode.

Preferably, the temperature adjustment means is a hollow passage formed inside of the power plate.

Preferably, the hollow passage penetrates the power plate in a zigzag pattern.

Preferably, the power plate is provided with a gas supply passage for guiding the gas between the plasma generation electrodes.

Advantageous Effects

The atmospheric plasma generation apparatus of the present invention is advantageous since uniform plasma can be generated in stable manner at an atmospheric pressure on the basis of a stable voltage supply.

Also, the atmospheric plasma generation apparatus of the present invention can supply gas into a discharge space in a stable manner.

BRIEF DESCRIPTION OF THE DRAWINGS

The above and other objects, features and advantages of the present invention will be more apparent from the following detailed description in conjunction with the accompanying drawings, in which:

FIG. 7 is a perspective view illustrating a gas supply plate of the atmospheric plasma generation apparatus of FIG. 6;

FIG. 8 is a perspective view illustrating a configuration of a plasma generation apparatus according to another exemplary embodiment of the present invention;

FIG. 9 is a cross sectional view illustrating a configuration of a plasma generation apparatus according to another exemplary embodiment;

BEST MODE FOR CARRYING OUT THE INVENTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
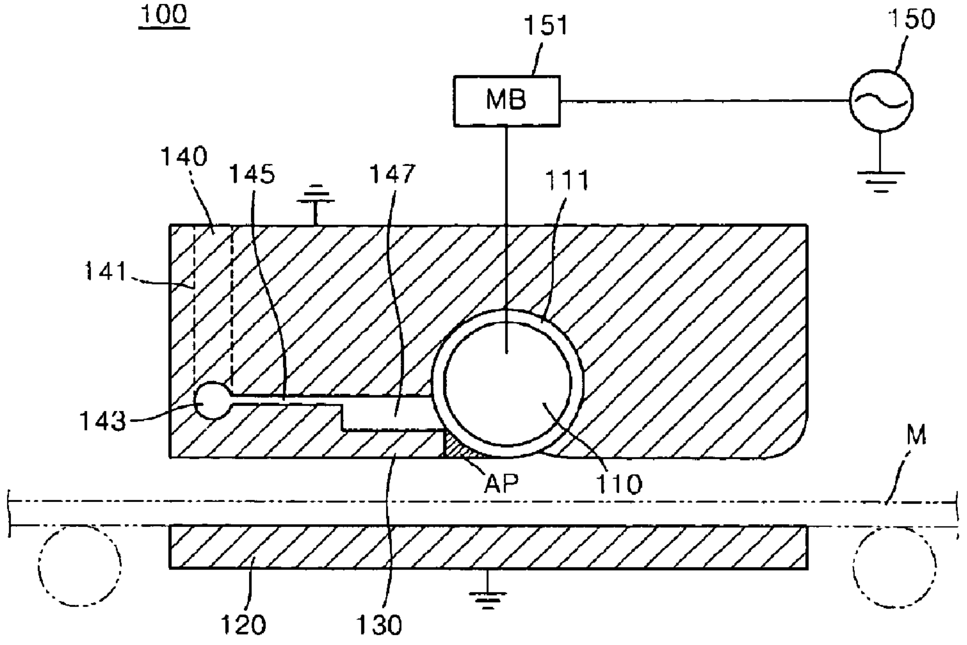
FIG. 1 is a cross sectional view illustrating a conventional atmospheric plasma generation apparatus.
Figure 2:
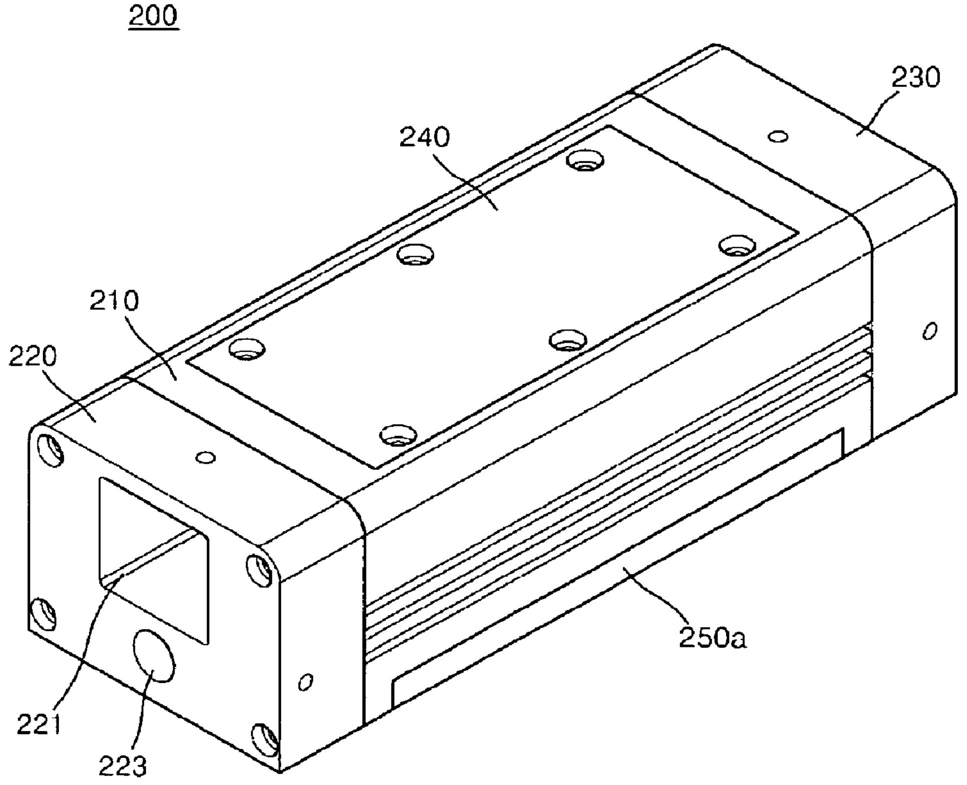
FIG. 2 is a perspective view illustrating an atmospheric plasma generation apparatus according to an exemplary embodiment of the present invention.
Figure 3:
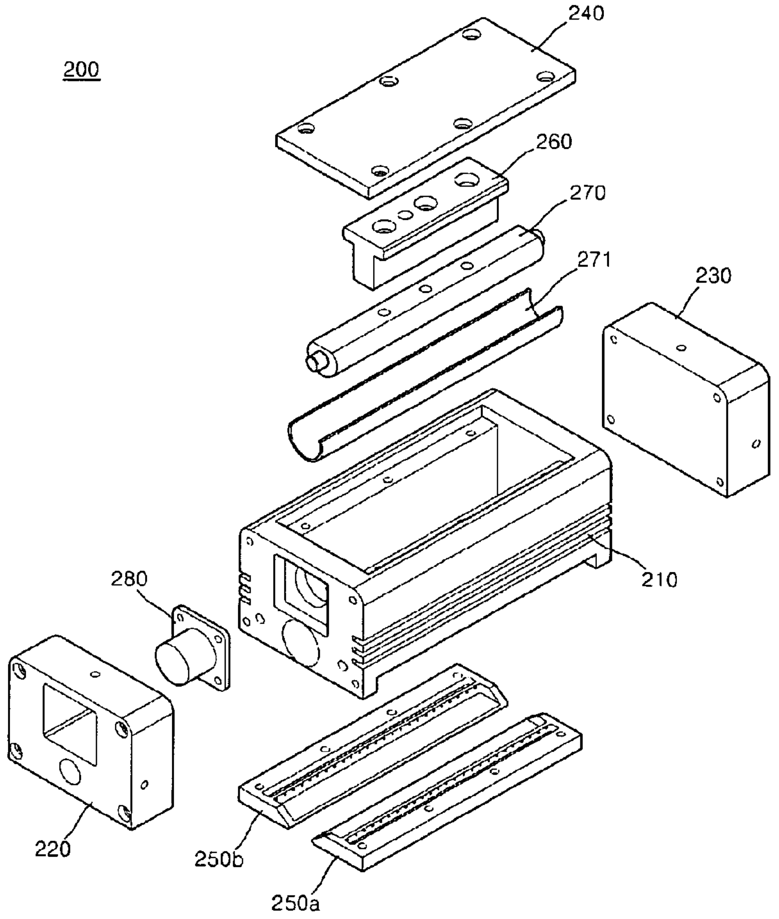
FIG. 3 is a disassembled perspective view illustrating the atmospheric plasma generation apparatus of FIG. 2.

FIG. 2 is a perspective view illustrating an atmospheric plasma generation apparatus according to an exemplary embodiment of the present invention, and FIG. 3 is a disassembled perspective view illustrating the atmospheric plasma generation apparatus of FIG. 2.

Referring to FIGS. 2 and 3, the atmospheric plasma generation apparatus 200 includes a gas supply unit 210, a first connection member 220, a second connection member 230, a cover 240, a first gas supplier 250*a*, a second gas supplier 250*b*, a first conductor including a power supply electrode 260 and a plasma generation electrode 270, and an interconnector 280. The atmospheric plasma generation apparatus 200 may further include a dielectric member 271.

Although not shown in drawings, the atmospheric plasma generation apparatus 200 may include a second conductor in addition to the first conductor. Structures and operations of the plasma generation apparatus according to an exemplary embodiment of the present invention are described hereinafter with reference to FIGS. 3 to 7.

The first conductor is aligned to face the object to be processed. Referring to FIG. 3, the first conductor includes the power supply electrode 260 and the plasma generation electrode 270, and the power supply electrode 260 is provided with a power plate. In this embodiment, the power is stably supplied to the plasma generation electrode 270. Preferably, the size of the power plate increases as the length of the plasma generation electrode 270 increases such that the power can be uniformly supplied to the plasma generation electrode 270.

According to the size of the power plate, a plurality of plasma generation electrodes can be arranged and connected to the power supply electrode. In order to simplify the explanation, it is assumed that the plasma generation apparatus of the present invention is provided with one plasma generation electrode 270.

The frequency of the power is in the range of 400 kHz~60 MHz. That is, the plasma generation apparatus of the present invention uses a voltage of high frequency. The gas is a mixture gas including over 50% of inert gas, and the inert gas is any of argon, helium, or neon, or a mixture of at least two of the gases.

Referring to FIG. 3, the plasma generation electrode 270 of the first conductor is arranged to face the object to be processed. The plasma generation electrode 270 is formed in a semicircular rod. However, the shape of the plasma generation electrode 270 is not limited thereto. For example, the plasma generation electrode 270 can be formed having a shape of a rectangular rod. That is, the shape of the surface of the plasma generation electrode 270, which is facing the object can be changed according to the shape of the plasma generation electrode 270.

*The plasma generation electrode 270 is connected to the power supply electrode 260 at least one longitudinal end thereof.

In order to supply the power to the plasma generation electrode 270 stably in longitudinal direction, the power plate forming the upper surface of the power supply electrode 260 is preferably formed to be wider than the upper surface of the plasma generation electrode 270.

In the meantime, the power supply electrode 260 is preferably formed such that its width is narrower than that of the upper surface of the plasma generation electrode 270. How the power supply electrode 260 and the plasma generation electrode 270 are connected to each other is described with reference to FIGS. 4 and 5.

Figure 4:
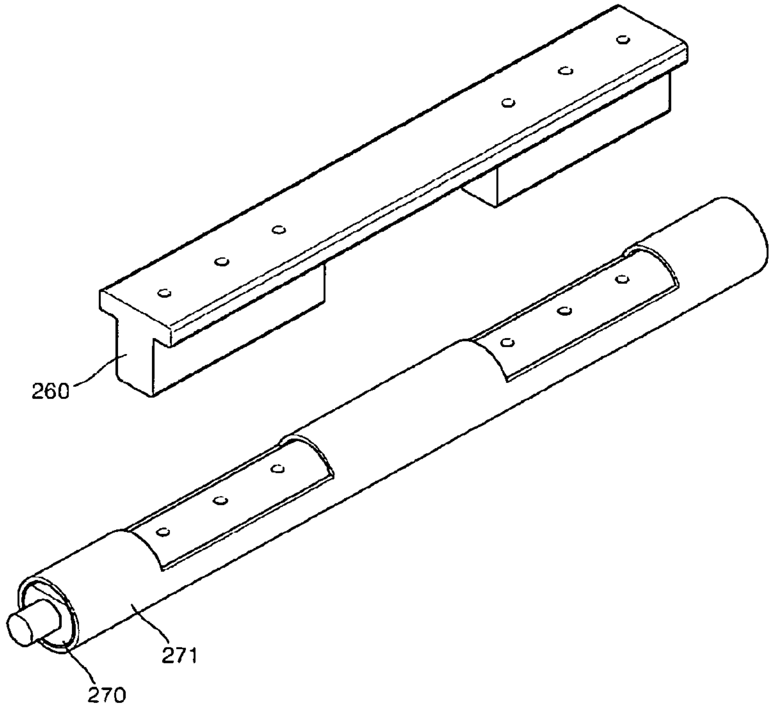
FIG. 4 is a perspective view illustrating a power supply electrode and a plasma generation electrode of the plasma generation apparatus according to an exemplary embodiment of the present invention.
Figure 5:
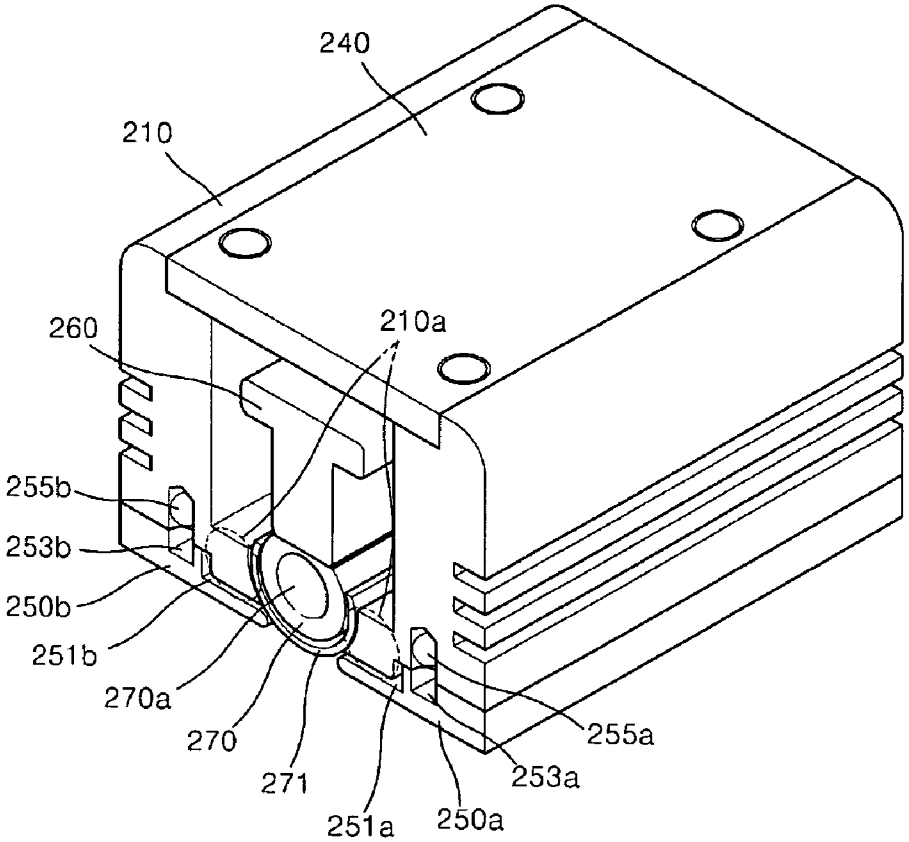
FIG. 5 is a perspective view illustrating a power electrode of a plasma generation apparatus according to an exemplary embodiment of the present invention.

FIG. 4 is a perspective view illustrating a power supply electrode and a plasma generation electrode of the plasma generation apparatus according to an exemplary embodiment of the present invention. In order to uniformly supply the power over the plasma generation electrode 270 in longitudinal direction. The power supply electrode 260 is formed in a shape of "T" in cross section. The plasma generation electrode 270 is formed such that its top surface is entirely connected to the bottom surface of the power supply electrode 260 (see FIGS. 3 and 40. In this manner, the power supply electrode 260 and the plasma generation electrode 270 are connected with large connection surfaces to supply the power uniformly in longitudinal direction of the plasma generation electrode 270.

Each of the power supply electrode 260 and the plasma generation electrode is provided with at least one connection hole such that the power supply electrode 260 and the plasma generation electrode 270 are tightly connected by means of coupling member such as bolt.

The plasma generation apparatus 200 is provided with a dielectric member 271 surrounding the plasma generation electrode 270. As shown in FIG. 3, the dielectric member 271 surrounds the plasma generation electrode 270 except for the surface contacted with the power supply electrode 260. The dielectric member 271 is made of any of quartz, glass, silicon, aluminum, and ceramic.

In FIG. 3, the entire top surface of the plasma generation electrode 270 is contacted with the bottom surface of the power supply electrode 260, and the dielectric member 271 surrounds the plasma generation electrode 270.

In the meantime, the top surface of the plasma generation electrode 270 of FIG. 4 is partially contacted with the bottom surface of the power supply electrode 260. In this case, the entire plasma generation electrode 270 is surrounded by the dielectric member 271. That is, the plasma generation electrode 270 are surrounded by the dielectric member 271 except for the portion contacted with the power supply electrode. Surrounding the plasma generation electrode 270 with the dielectric member 271 in this manner prevents the dielectric member 271 from being cracked.

Figure 6:
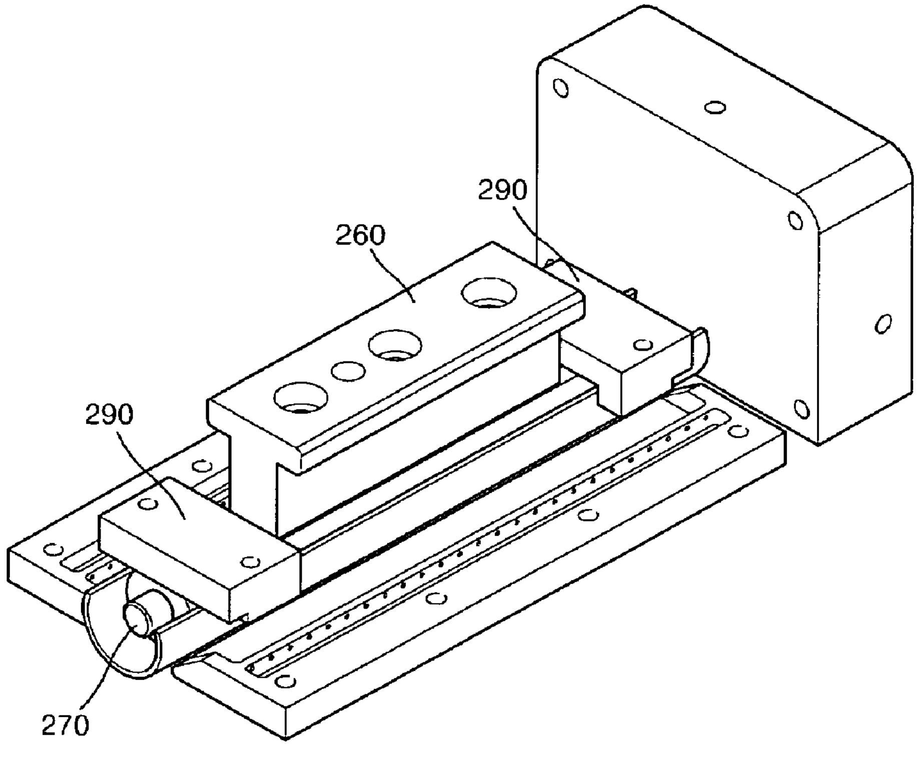
FIG. 6 is a perspective view illustrating an atmospheric plasma generation apparatus according to anther exemplary embodiment of the present invention.

Referring to FIG. 6, the plasma generation apparatus 200 further includes a fixing member 290 for fixing the plasma generation electrode to the gas supply unit 210. In this embodiment, the plasma generation electrode 270 connected to the power supply electrode 260 is connected to the gas supply unit 210 by means of the fixing member 290 such that the first conductor is fixed to the gas supply unit 210.

According to an embodiment of the present invention, the power plate may be provided with a temperature adjustment means (not shown) for controlling the temperature of the first conductor. As shown in FIG. 3, the power plate is formed with a predetermined thickness and of which temperature is adjusted by the temperature adjustment means installed thereon.

The temperature adjustment means can be a temperature adjusting passage (not shown) formed so as to penetrate the power plate. The temperature adjusting passage can be filled with fluid such as water. The fluid can be cooled or heated water for decreasing or increasing the temperature of the power plate and, in turn, the first conductor. It is preferred that the temperature adjusting passage is formed in a zigzag pattern for improving the temperature adjustment effect.

The second conductor arranged with a distance to the object to be processed along the first conductor. In the structure of FIGS. 3 and 4, low parts of the gas supply plates 250*a* and 250*b* act as the second conductor. Between the plasma generation electrode 270 and the second conductor, mixture space 251*a* and 251*b* is formed.

Since the structure and operation of the second conductor forming the discharge space together with the first conductor are well known to those skilled in the art, the description on the structure and operation of the second conductor is omitted.

The gas supply unit 210 is provided with a gas supply passage for supplying the gas to the discharge space. The first conductor is supported by the gas supply unit 210. The structure and function of the gas supply function is described later.

The first and second connection member 220 and 230 are provided with a plurality of connection holes for connecting to the gas supply unit 210 so as to be connected to the gas supply unit 210 by means of various coupling means such as bolt.

The first connection member 220 is provided with a power connection hole 221 to which a power source is connected and a gas supply hole 223 for supplying the gas from outside. The power is supplied to the power plate of the first electrode 260 and 270 through a connector 280 penetrating the power connection hole 221. The connector 280 and the power plate are connected to each other in various manners known to those skilled in the art.

The gas is guided to the gas supply passage of the gas supply unit 210 through the gas supply hole 223. Generally, the gas is guided into the gas supply hole 223 through a gas supply line (e.g., hose). In an embodiment of the present invention, a connection means are installed at the inlet of the gas supply hole 223 for receiving the gas supply line.

The inlet of the gas supply hole 223 is preferably formed with relatively large aperture for easy flowing of the gas. Also, in order for the gas to flow into gas inlet passages 255*a* and 255*b* of the gas supply unit 210, a gas guide passage (not shown) is formed in the first connection member 220 in width direction. The gas guide passage is formed to communicate between the gas supply hole 233 and the gas inlet passage 225*a* and 225*b*. The detailed structure of the gas supply passage communicated with the gas guide passage is described later.

FIG. 6 is a perspective view illustrating an atmospheric plasma generation apparatus according to anther exemplary embodiment of the present invention, and FIG. 7 is a perspective view illustrating a gas supply plate of the atmospheric plasma generation apparatus of FIG. 6.

In this embodiment, the gas supply passage is formed along the gas supply member and the gas supply plate. Referring to FIGS. 6 and 7, the gas supply passage is formed with the gas inlet passages 255*a* and 255*b*, buffer spaces 253*a* and 253*b*, mixture space 251*a* and 251*b*, and a plurality of orifices 252*a*.

The gas led from outside through the gas supply hole 223 is guided to the gas inlet passages 255*a* and 255*b* via the gas guide passage communicating between the gas supply hole 223 and the gas inlet passage 255*a* and 255*b*. As shown in FIG. 6, the gas supply passage is formed in symmetrical manner on an axis of the first conductor. Accordingly, the right part of the gas supply passage is representatively described.

As shown in FIG. 6, the gas inlet passage 255*a* is formed on the first conductor in its longitudinal direction. Around the gas inlet passage 255*a*, a hole is formed for guiding the gas to the buffer space 253*a*. Accordingly, it is enough to form the gas inlet passage 255*a* to the hole rather than along the entire length of the gas supply unit 210. In order to secure the stable gas supply to the buffer space 253*a*, more than one hole can be formed.

The buffer space 253*a* is formed along the first conductor in its longitudinal direction and communicated with the gas inlet passage 255*a* through the hole. The gas guided to the buffer space 253*a* through gas inlet passage 255*a* is buffered therein so as to be uniformly supplied along the longitudinal direction of the first conductor.

The buffered gas is supplied into the mixture space through the orifices 252*a*. As shown in FIG. 7, the orifices 252*a* are formed to the mixture space 251*a* at pre-determined intervals along the first gas supply plate 250*a*.

The mixture space 251*a* is formed along the buffer space 253*a* with a bank in between so as to communicate with the discharge space formed along the first conductor. As shown in FIGS. 6 and 7, the mixture space 25 la is provided with a vertical space and a horizontal space communicated with the discharge space. The gas guided to the mixture space 251*a* through the orifices 252*a* formed in horizontal direction is buffered again in the vertical space and regulated by bumping to the vertical inner wall. The gas regulated in such manner is mixed with the oxygen and then supplied to the discharge space.

As described above, in the plasma generation apparatus of the present invention, the gas led to the discharge space through the gas supply passage is buffered and regulated twice in the buffer space 253*a* and the mixture space 251*a*. Accordingly, the plasma generation apparatus of the present invention can improve the uniformity of the mixture gas supplied in the discharge space in comparison with the conventional plasma generation apparatus.

Referring to FIG. 6, the gas supply unit 210 is partially formed with an insulation part 210*a* facing the dielectric member 271. Without the insulation part 210*a*, capacitor effect generates at some portion adjacent to any of the plasma generation electrode 270, dielectric member 271, and gas supply unit 210 such that the power to be supplied to the plasma generation electrode is wasted. The capacitor effect can be removed by forming the insulation part 210*a* on the gas supply unit 210 so as to protect unnecessary power waste, thereby increasing the reaction of the gas to the plasma generation electrode 270, resulting in improvement of the plasma generation efficiency.

Also, the entire of the gas supply unit 210 can be made of a dielectric material. In this case, it is possible to protecting the generation of capacity between the dielectric member 271 and the portion 210*a*, thereby increasing the plasma generation efficiency.

In FIG. 6, the plasma generation electrode 270 is provided with passage holes 270*a* formed inside of the plasma generation electrode 270 unlike in FIG. 4. By flowing a temperature adjustment liquid such as water, the temperature of the plasma generation electrode 270 can be adjusted.

Although the gas inlet passages 255*a* and 255*b* for guiding the gas to the buffer space are formed in the longitudinal direction, the gas inlet passages can be changed in various shapes. FIG. 8 shows exemplary gas inlet passages.

FIG. 8 is a perspective view illustrating a configuration of a plasma generation apparatus according to another exemplary embodiment of the present invention. In FIG. 8, the plasma generation apparatus has the same structure as in the FIG. 2 except for the structure of the gas inlet passages 255*a*' and 255*b*'. That is, the gas inlet passages 255*a*' and 255*b*' of the plasma generation apparatus of FIG. 8 is formed in vertical direction relative to the top surface of the gas supply unit so as to communicate to the buffer space 253*a*.

Figure 10:
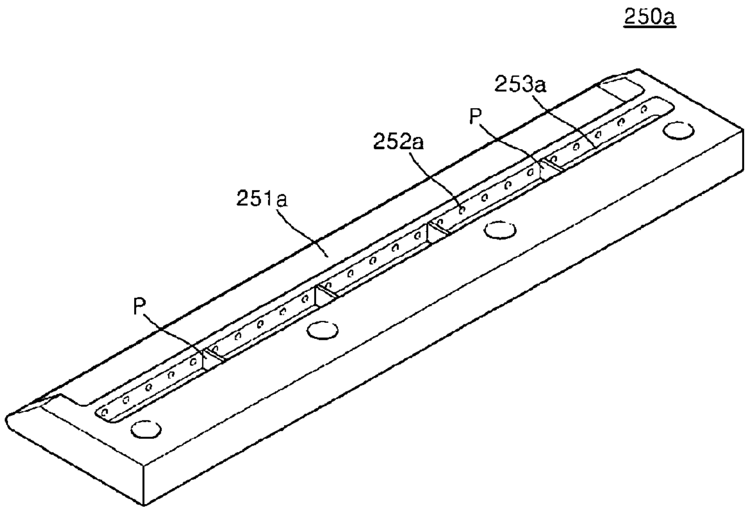
FIG. 10 is a perspective view illustrating a gas supply plate of the plasma generation apparatus of FIG. 9.

FIG. 9 is a cross sectional view illustrating a configuration of a plasma generation apparatus according to another exemplary embodiment, and FIG. 10 is a perspective view illustrating a gas supply plate of the plasma generation apparatus of FIG. 9.

The plasma generation apparatus of FIG. 9 is similar to the plasma generation apparatus of FIG. 8 in the directions of the gas inlet passages 255*a*1, 255*a*2, and 255*a*3. However, the shapes of the gas inlet passages of the two plasma generation apparatus are different from each other. Referring to FIGS. 9 and 10, the buffer space of the gas supply plate is provided with a plurality sub-buffer space 253*a*1, 253*a*2, and 253*a*3 corresponding to the gas inlet passages 255*a*1, 255*a*2, and 255*a*3. The sub-buffer spaces 253*a*1, 253*a*2, and 253*a*3 are independently formed and have respective orifices 252*a*.

With the structures of FIGS. 9 and 10, the plasma generation apparatus can selectively supply the gas to the plasma generation electrode. If only the first gas inlet passage 255*a*1 is selected, the gas is supplied to the plasma generation electrode through its corresponding orifices 252*a* of the sub-buffer space 253*a*1 such that the plasma is generated at a corresponding portion.

The buffer space is divided into several sub-buffer spaces by partitions (P), and each sub-buffer space is provided with gas outlets corresponding to the gas inlet passage. With this configuration, it is possible to generate plasma around a specific portion of the plasma generation electrode.

Figure 11:
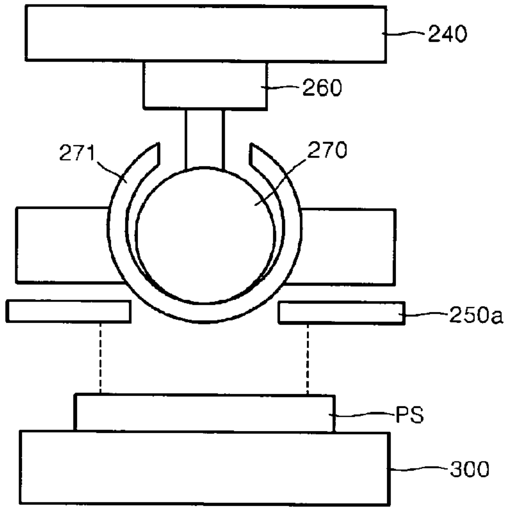
FIGS. 11 to 13 are cross sectional view illustrating a third ground of a plasma generation apparatus according to an exemplary embodiment of the present invention.
Figure 12:
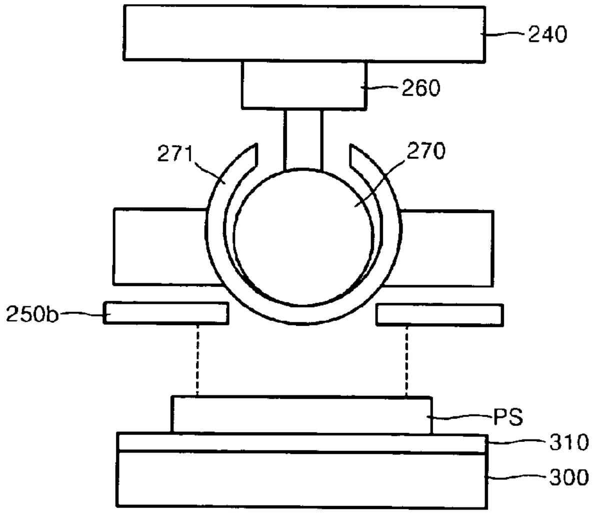
Figure 13:
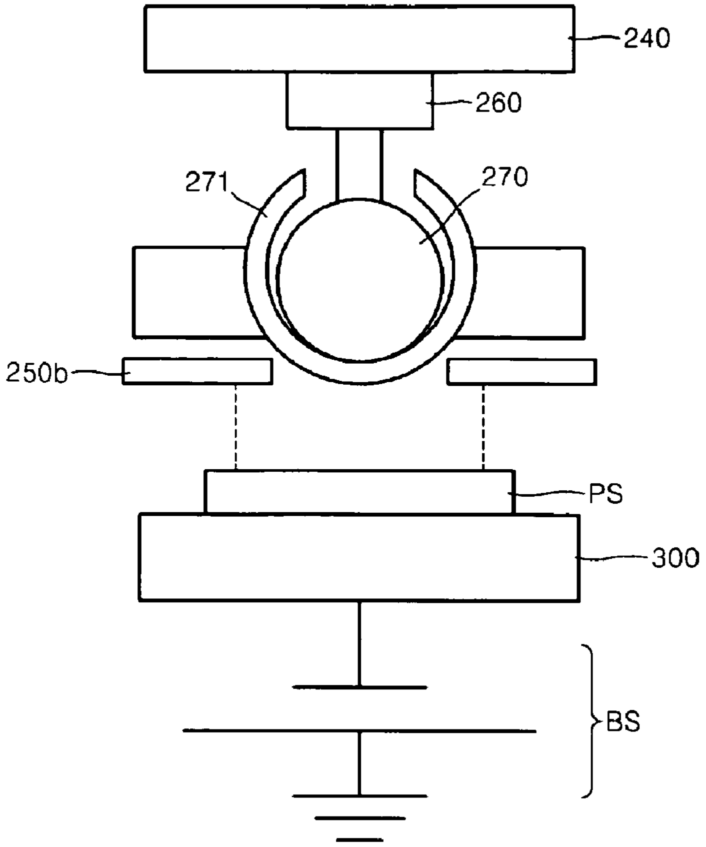

FIGS. 11 to 13 are cross sectional view illustrating a third ground of a plasma generation apparatus according to an exemplary embodiment of the present invention.

Referring to FIG. 11, the plasma generation apparatus according to an embodiment of the present invention is provided with a third conductor 300. The object (PS) is placed on the third conductor 300 and processed by the plasma gas. In the conventional vacuum plasma processing apparatus and low frequency voltage plasma processing apparatus, the third conductor is connected to ground. This is because, in the case of using low frequency voltage, plasma may not be generated without ground connection. In the plasma generation apparatus of the present invention, however, high frequency voltage is used such that the plasma is generated without ground connection of the third conductor 300.

Referring to FIG. 12, the plasma generation apparatus according to an embodiment of the present invention is provided with a dielectric member 310 between the third conductor 300 and the object to be processed. The dielectric member 310 prevents an electric art from being generated between the first conductor and the third conductor 300 when a high voltage is applied therebetween.

Referring to FIG. 13, the third conductor 300, on which the object to be processed is placed, is applied by a pulse power or a direct current power (BS). In this case, the negative ions and positive ions are accelerated, thereby improving efficiency of the deposition or etching process.

Although it is depicted that the first conductor is provided with one plasma generation electrode 270, the plasma generation apparatus of the present invention is not limited to such configuration. For example, the plasma generation apparatus of the present invention can be configured with more than on plasma generation electrode.

FIGS. 14 to 17 are schematic views illustrating configurations of plasma generation apparatus according to exemplary embodiments of the present invention.

In order to simplify the explanation, the plasma generation apparatus are schematically depicted in the drawings, however, it is obvious to those skilled in the art that the configurations of the plasma generation apparatus depicted in FIGS. 14 to 17 are not deviate from the scope of the present invention. Although the plasma generation apparatus' of FIGS. 14 to 17 are implemented with one or three plasma generation electrodes, the number of the plasma generation electrodes is not limited thereto.

Figure 14:
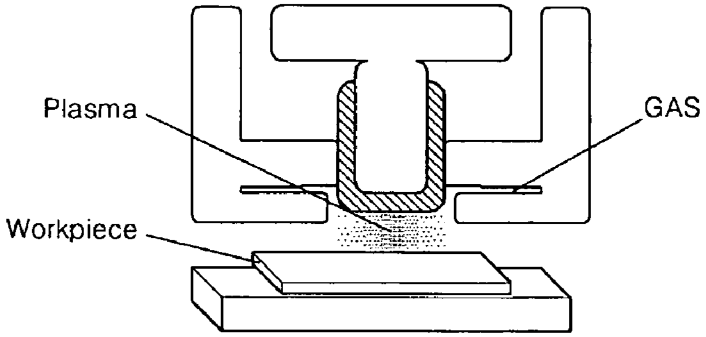
FIGS. 14 to 17 are schematic views illustrating configurations of plasma generation apparatus according to exemplary embodiments of the present invention.
Figure 15:
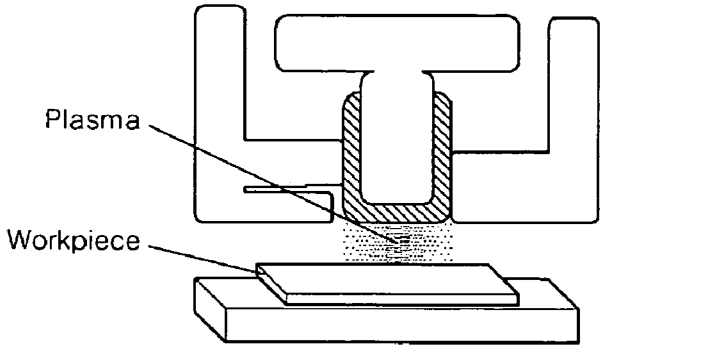

FIG. 14 is a conceptual view illustrating the plasma generation apparatus configured as in FIGS. 2 to 7, and FIG. 15 is a conceptual view illustrating a modified version of the plasma generation apparatus of FIG. 14.

Figure 16:
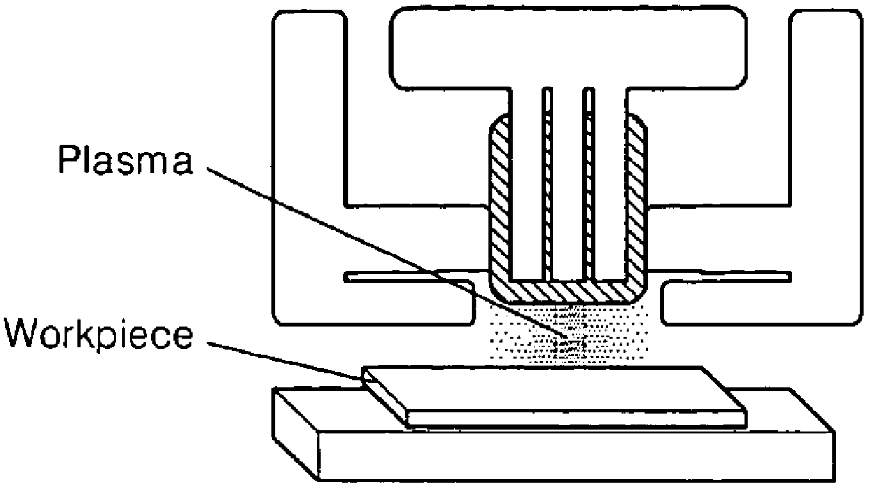
Figure 17:
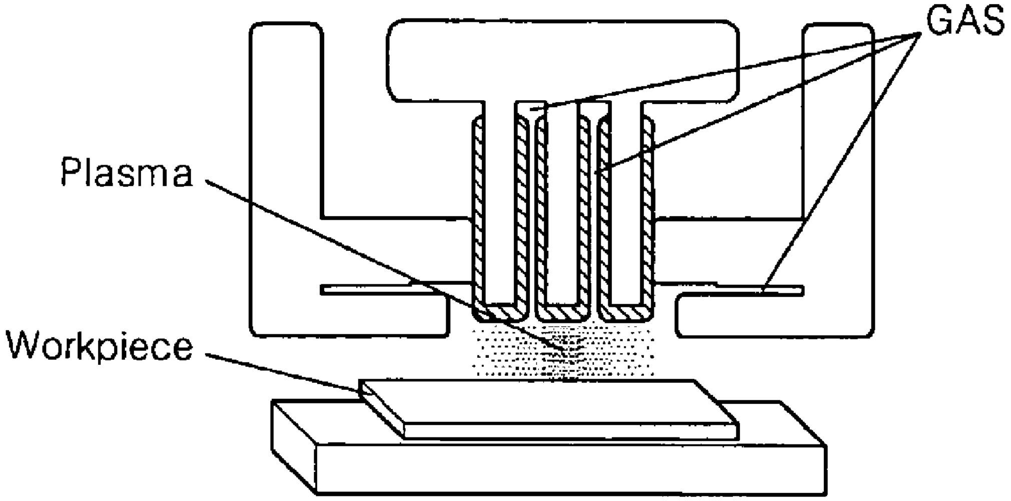

In FIGS. 16 and 17, the power supply electrode (i.e., the first conductor) of the plasma generation apparatus is provided with a power plate, to which the power is applied, and at least one plasma generation electrode. In this case, the plasma generation electrode is connected to the power plate entirely or partially in longitudinal direction.

The plasma generation apparatus of FIG. 16 is implemented with three plasma generation electrodes that are surrounded by dielectric material and isolated from each other by means of the dielectric materials in between. The plasma generation apparatus of FIG. 17 is implemented with three plasma generation electrodes that are independently surrounded by respective dielectric materials, and the gas can flow through gaps formed between the plasma generation electrodes.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

INDUSTRIAL APPLICABILITY

The plasma generation apparatus of the present invention can be applied to various plasma processing fields.

The invention claimed is:

1. A plasma generation apparatus comprising:

a first conductor arranged with a surface to face a workpiece along a length of the first conductor and having a power plate opposite to the surface through which power is applied along the length of the first conductor;

a second conductor arranged oppositely to the surface of the first conductor facing the workpiece along the length of the first conductor to define a discharge space between the first and second conductors; and a gas supply unit having a gas supply passage for guiding gas to the discharge space and supporting the first and second conductors so as to generate plasma in the discharge space when the power is applied to the power plate.

2. The plasma generation apparatus of claim 1, wherein the first conductor comprises: a power supply electrode connected to the power plate; and at least one plasma generation electrode connected in at least one part to the power supply electrode along the length of the first conductor.

3. The plasma generation apparatus of claim 2, further comprising a dielectric member surrounding the plasma generation electrode except for one side connected to the power supply electrode.

4. The plasma generation apparatus of claim 3, wherein the gas supply unit comprises a dielectric part adjacent to the dielectric member.

5. The plasma generation apparatus of claim 2, wherein a width of the power plate is wider than a width of the plasma generation electrode.

6. The plasma generation apparatus of claim 2, further comprising a fixing unit which connects the plasma generation electrode to the gas supply unit.

7. The plasma generation apparatus of claim 2, wherein the power plate comprises a temperature adjustment mechanism which adjusts a temperature of the first conductor.

8. The plasma generation apparatus of claim 7, wherein the temperature adjustment mechanism comprises a hollow passage formed inside of the power plate.

9. The plasma generation apparatus of claim 8, wherein the hollow passage penetrates the power plate in a zigzag pattern.

10. The plasma generation apparatus of claim 2, wherein the power plate is provided with a gas supply passage for guiding the gas between the plasma generation electrodes.

11. The plasma generation apparatus of claim 1, wherein the gas supply unit comprises a dielectric material.

12. The plasma generation apparatus of claim 1, wherein the gas supply passage comprises:
- a gas inlet passage for leading the gas from outside;
- a buffer space formed to communicate with the gas inlet passage in a longitudinal direction;
- a mixture space formed having a distance with the buffer space and communicate with the discharge space along the longitudinal direction; and
- a plurality of orifices formed so as to orient from the buffer space to the mixture space horizontally.

13. The plasma generation apparatus of claim 12, wherein the gas inlet passage is formed on a top surface of the gas supply unit in multiple numbers, and the buffer space is provided with sub-buffer spaces corresponding to the respective gas inlet passage, adjacent sub-buffer spaces being provided with a plurality of orifices isolated from each other.

14. The plasma generation apparatus of claim 1, wherein the power is provided at a frequency range between 400 khz and 60 Mhz.

15. The plasma generation apparatus of claim 1, wherein the gas is a mixture gas including over 50% of inert gas, and the inert gas is any of argon, helium, or neon, or a mixture of at least two of the gases.

16. The plasma generation apparatus of claim 1, further comprises a third conductor on which the workpiece is placed, the third conductor being not connected to ground.

17. The plasma generation apparatus of claim 16, further comprising a dielectric plate on a top surface of the third conductor on which the workpiece is placed.

18. The plasma generation apparatus of claim 1, further comprises comprising a third conductor on which the workpiece is placed and to which a pulse power or a direct current power is applied.

19. A conductor assembly for use in generating plasma in a plasma generation apparatus, comprising:
- a power supply electrode having a length;
- a power plate connected to a first surface of the power supply electrode and to which a power is applied along the length of the power supply electrode; and
- at least one plasma generation electrode connected to at least one part of a second surface of the power supply electrode along the length of the power supply electrode such that the applied power is applied along a length of the plasma generation electrode.

20. The power supply electrode of claim 19, further comprising a dielectric member surrounding the plasma generation electrode except for one side connected to the power supply electrode.

21. The power supply electrode of claim 20, wherein the dielectric member surrounds the plasma generation electrode expert for one side connected to the power plate, the dielectric member being made of at least one of quartz, glass, silicon, aluminum, and ceramic.

22. The power supply electrode of claim 19, wherein the power plate further comprises a temperature adjustment mechanism which adjusts a temperature of the plasma generation electrode.

23. The power supply electrode of claim 22, wherein the temperature adjustment mechanism comprises a hollow passage formed inside of the power plate.

24. The power supply electrode of claim 23, wherein the hollow passage penetrates the power plate in a zigzag pattern.

25. The power supply electrode of claim 19, wherein the power plate is provided with a gas supply passage for guiding the gas between the plasma generation electrodes.

* * * * *

UNITED STATES PATENT AND TRADEMARK OFFICE

CERTIFICATE OF CORRECTION

PATENT NO. : 8,373,088 B2
APPLICATION NO. : 12/449252
DATED : February 12, 2013
INVENTOR(S) : Bang Kwon Kang It is certified that error appears in the above-identified patent and that said Letters Patent is hereby corrected as shown below:

Column 12, line 5, delete “comprises”.

Signed and Sealed this
Second Day of April, 2013

Teresa Stanek Rea
*Acting Director of the United States Patent and Trademark Office*